(12) United States Patent
Bayer et al.

(10) Patent No.: US 7,166,175 B2
(45) Date of Patent: Jan. 23, 2007

(54) METHOD AND DEVICE FOR HARDENING A METAL COMPONENT BY PLASMA PULSE TECHNOLOGY

(75) Inventors: Erwin Bayer, Dachau (DE); Henri Wagner, Stuttgart (DE)

(73) Assignee: MTU Aero Engines GmbH, Munich (DE)

(*) Notice: Subject to any disclaimer, the term of this patent is extended or adjusted under 35 U.S.C. 154(b) by 192 days.

(21) Appl. No.: 10/343,098

(22) PCT Filed: Jul. 21, 2001

(86) PCT No.: PCT/DE01/02777

§ 371 (c)(1),
(2), (4) Date: Sep. 5, 2003

(87) PCT Pub. No.: WO02/09905

PCT Pub. Date: Feb. 7, 2002

(65) Prior Publication Data

US 2004/0074572 A1 Apr. 22, 2004

(51) Int. Cl.
 *C22F 3/00* (2006.01)
(52) U.S. Cl. .................. 148/525; 148/565; 219/121.59
(58) Field of Classification Search ................ 148/525, 148/565; 219/121.59
 See application file for complete search history.

(56) References Cited

U.S. PATENT DOCUMENTS

| 4,426,867 A | | 1/1984 | Neal et al. | |
| 5,231,057 A | * | 7/1993 | Doki et al. | 438/637 |
| 5,525,429 A | | 6/1996 | Mannava et al. | |
| 5,626,922 A | * | 5/1997 | Miyanaga et al. | 427/535 |
| 5,846,057 A | | 12/1998 | Ferrigno et al. | |
| 5,911,891 A | * | 6/1999 | Dulaney et al. | 219/121.85 |
| 6,005,219 A | | 12/1999 | Rockstroh et al. | |
| 6,075,593 A | * | 6/2000 | Trantow et al. | 356/318 |
| 6,197,133 B1 | * | 3/2001 | Unternahrer et al. | 148/525 |

FOREIGN PATENT DOCUMENTS

| DE | 242429 | 1/1987 |
| DE | 4226229 | 2/1994 |
| DE | 4436163 | 4/1996 |
| EP | 0 933 438 A1 | 8/1999 |
| JP | 57-164921 | 10/1982 |

OTHER PUBLICATIONS

Joseph C. Danko et al., "High-Energy Electron Beam Technology", Advanced Materials and Processes, Tech Spotlight, pp. 35-37.

* cited by examiner

*Primary Examiner*—George Wyszomierski
(74) *Attorney, Agent, or Firm*—Crowell & Moring LLP

(57) ABSTRACT

A process and a device for the pulsed plasma strengthening of a metallic component, in which the surface to be strengthened is not acted on in a merely punctiform manner and the roughness of the surfaces is not adversely effected, comprising the steps of: providing a metallic component (1, 8, 18), coating a surface section (7, 7') of the metallic component (1, 8, 18) with a sublimable material (22), applying a pulsed plasma jet (20) to the surface section (7, 7') in such a way that the material is sublimed and as a result a shock wave is introduced into the component (1, 8, 18) in order to form residual compressive stresses in a region which extends from the surface section (7, 7') into the component (1, 8, 18).

17 Claims, 2 Drawing Sheets

METHOD AND DEVICE FOR HARDENING A METAL COMPONENT BY PLASMA PULSE TECHNOLOGY

This application is a National Stage entry of PCT/DE01/02777, filed 21 Jul. 2001.

BACKGROUND OF THE INVENTION

The present invention relates to a process and an apparatus for the pulsed plasma strengthening of a metallic component.

Components of gas turbines are subject to vibrational loads and are also exposed to mechanical or fluid-dynamic or erosive wear. Internal compressive stresses are introduced into the components by shot peening or pulsed laser strengthening in order to extend the service life. Shot peening has the drawback that the surface of the component is adversely affected in terms of the roughness on account of the impacts of the shot. A drawback of the pulsed laser strengthening process, in addition to the very poor efficiency of the laser, is the punctiform area of action of the laser pulse, which is locally restricted to the focal region of the laser, on the component surface which is to be strengthened.

SUMMARY OF THE INVENTION

An object of the present invention is to provide a process for strengthening a metallic component which does not merely act in punctiform manner on the surface to be strengthened and also does not adversely affect the roughness of the surface. Moreover, it is intended to provide a corresponding device for strengthening a metallic component.

In terms of the process, according to the invention, a solution has been found by providing a metallic component, coating a surface section of the metallic component with a sublimable material, applying a pulsed plasma jet to the surface section so that the material is sublimed and as a result a shock wave is introduced into the component in order to form residual compressive stresses in a region which extends from the surface section into the component.

In the inventive process, the component is strengthened at the surface and the regions close to the surface without the component roughness being increased, this increased roughness being undesirable in particular for components of gas turbines, on account of aerodynamic and strength aspects. The component surface is not damaged by the pulsed plasma strengthening. Moreover, the plasma jet, which consists of a mixture of electrons and positively charged atomic nuclei (ions) and therefore includes matter, at the surface of the component acts on a significantly larger area than the focal region of a laser beam. As a result, the process can be carried out more quickly and more economically. The material which is used to coat the surface of the component which is to be strengthened sublimes in a short high-energy pulse on account of the conversion of the thermal and kinetic energy of the plasma pulse. The introduction of this sublimation detonation shock in the form of a shock wave into the component causes the latter to be strengthened or hardened at the surface and in regions close to the surface down to penetration depths of approximately 2 mm, on account of microstructural changes.

Unlike the pure light beam of the laser pulse, the plasma jet is a targeted jet of matter whose energy is composed of a kinetic component and a thermal component. These components usually each amount to approximately 50%. The kinetic energy component causes the plasma jet to penetrate into the layer of sublimable material and ensures a highly efficient introduction of energy or power. The sublimation of this layer and the resulting shock wave are then generated through conversion of the overall energy of the plasma jet. The kinetic effect, i.e. the deceleration of the extremely highly accelerated particles of the plasma jet, results in a high pressure being exerted on the layer of sublimable material and the component itself, preventing the sublimation gases from escaping prematurely and making it possible to improve the introduction of the shock wave into the component. The use of what are known as covering layers or mist, which is required with laser pulses, is not necessary.

With special plasma jets, permanent compressive stresses can now be introduced into a region extending from the surface section into the component purely by utilizing the kinetic effect.

On account of the permanent compressive stresses, the wall thicknesses of components, which are subject to vibrational loads and therefore the weight of these components, can be reduced. The shock wave which enters the body is generated at the surface of the component as a result of the action of the pulsed plasma jet on the sublimable material and the associated detonation-like sublimation.

The process can be used to strengthen and harden compressor components, such as blades, vanes or discs, made from Ti-based alloys and also components made from Fe- or Ni- or Co-based alloys in regions close to the surface.

The region which has been pulsed plasma strengthened significantly increases the fatigue strength of components which are subject to vibrational loads, on account of the formation of permanent compressive stresses in the regions close to the surface. The introduction of compressive stresses into the component by pulsed plasma strengthening also affects the service life of blades, vanes and discs of compressors or turbines of gas turbines which are subject to vibrational loads. Moreover, the pulsed plasma strengthening of the regions close to the surface has positive, life-extending effects with regard to frictional corrosion, known as fretting, which occurs at the contact points between blade roots and receiving grooves in discs.

The sublimable material is preferably organic, e.g. a thermoplastic, such as PVC, PE, PP, and acts as a energy-transmitting medium, via which the sublimation detonation shock which is formed when the pulsed plasma jet impinges is introduced into the component as a shock wave.

The plasma jet is applied areally to the surface section of the component and can act on an area of approximately 10 cm2 and larger per plasma pulse. This value can be varied by the power data and the geometry of the pulsed plasma source used, and is matched to the geometry of the surface section which is to be strengthened.

On account of the highly efficient introduction of energy and pulses into the layer of sublimable material, the component can be strengthened or hardened down to penetration depths of approximately 2 mm as a result of microstructural changes brought about by the shock waves.

The surface section can be exposed to a plasma jet with a velocity of at least approximately 150 km/s, so that the particles of the plasma jet penetrate into the layer of sublimable material and do not rebound.

The pulsed plasma jet can be generated on the basis of a pulsed high-current arc discharge, in which case the working gas which is ionized by the arc, such as He or Ar, emerges from a pulsed plasma source in the form of a detonation-like plasma jet.

The process is preferably carried out under a vacuum in the region of $10^{-7}$ bar, in order to avoid energy losses from the plasma jet and therefore a reduction in efficiency. The device is characterized by an efficiency in the range from 40% to 50%.

The pulsed plasma strengthening process can also be used effectively for components of gas turbines or the like which have already been subject to damage in operation, in the form of cracks or notches. With components of this type, a surface section which lies in the region of the damage is exposed to the plasma jet so that permanent compressive stresses are introduced into the component, with the result that further crack propagation is prevented and the remaining service life of this component can be increased to the level of new parts.

The device according to the present invention is characterized by a pulsed plasma source having a volume for holding working gas and a nozzle which is directed towards a metallic substrate, holding and positioning apparatus for the pulsed plasma source and the substrate, a device for coating the substrate with a sublimable material, a device for discontinuously feeding working gas into the volume and a device for introducing extremely high power into the plasma gas in order to generate a pulsed plasma jet which emerges in the manner of a detonation. In this case, the particles of the plasma jet are accelerated to ultrasound velocity.

In order to bring about the extremely high introduction of power of an order of magnitude of 10 GW for the detonation-like emergence of the plasma from the pulsed plasma source, the energy is preferably introduced by high-current arc discharge.

The device for discontinuously feeding working gas into the volume preferably includes at least one valve, which is controlled so that new working gas is supplied immediately after the detonation-like emergence of plasma gas.

The pulsed plasma jet may emerge at frequencies in the range from 1–10 Hz, depending on the capacitor charging unit and the valve.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
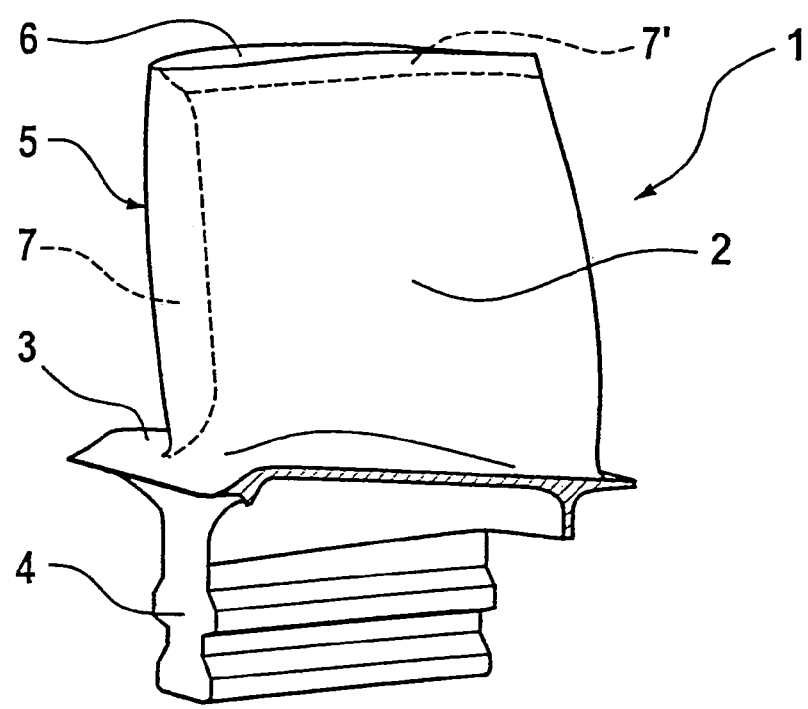
FIG. 1 is a perspective illustration of a blade or vane of a gas turbine, the surface of which, at least in sections, can be pulsed plasma strengthened using the process according to the present invention.

FIG. 1 shows a blade or vane of a gas turbine which is denoted overall by numeral 1 and the surfaces or regions close to the surface of which are strengthened and hardened at least in sections by plasma pulses, so as to introduce permanent compressive stresses. The pulsed plasma strengthening process can be used both for blades or vanes 1 of compressors and of turbines. When a gas turbine is operating, the blade or vane 1 is subject to particularly high vibrational loads at the transition from an inner platform 3 to the blade leaf 2 or to the blade root 4. In addition, the blade root 4 is also subject to frictional corrosion or fretting.

Furthermore, the surfaces of the gas turbine component in the flow duct are exposed to fluid-dynamic wear or erosion from particles, contaminants or the like, the greatest potential for damage lying in the region of a leading edge 5 of the blade or vane 1. The regions of the blades or vanes 1 which sweep past the housing of the gas turbine, such as, for example, blade or vane tips 6 or sealing tips or sealing fins (not shown) on blades or vanes with a cover strip, are exposed to mechanical wear and can be treated in the same way by pulsed plasma strengthening with a view to being reinforced.

By way of example, a surface section 7 is indicated by dashed lines in the region of the leading edge 5 of the blade or vane 1 and can be pulsed-plasma strengthened in accordance with an exemplary embodiment of the process according to the invention, in order to introduce permanent compressive stresses in a region which extends from the surface section 7 into the component 1 and in this way to strengthen the component 1. A further surface section 7', which lies in the region of the blade or vane tip 6 and is likewise indicated by dashed lines, can be pulsed plasma strengthened in accordance with an exemplary embodiment of the process according to the invention, in order to mechanically reinforce the blade or vane at that location and to protect it against wear during stripping.

Detachable blades or vanes 1 of this type are secured in a positively locking manner to discs with numerous longitudinal grooves or one encircling circumferential groove. Like the root 4 of the blade or vane 1, grooves of this type (not shown) in discs are regions which are critical in terms of stresses and are at risk of fracture and which can be pulsed plasma strengthened in order to increase the service life.

Figure 3:
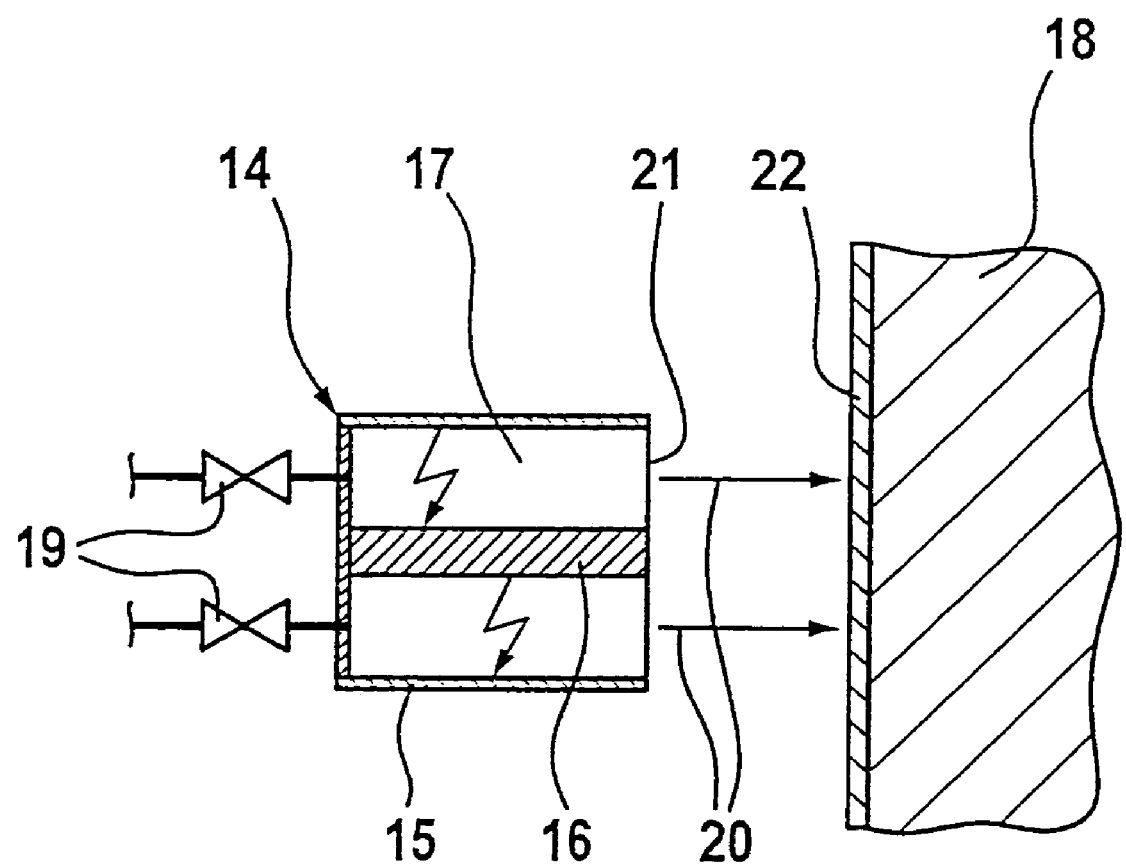
FIG. 3 is a schematic diagram which depicts a device with a pulsed plasma source according to the present invention.

In the process for pulsed plasma strengthening, the blade or vane 1, as diagrammatically depicted in FIG. 3 as a component 18, is fixed in a holding and positioning device in such a way that a pulsed plasma source 14 can apply a pulsed plasma jet 20 to the surface section 7, 7' which is to be strengthened. Before this, the surface section 7, 7' is coated with a layer 22 of sublimable material, such as for example a thermoplastic, such as PVC, of a suitable thickness. The thickness of the layer 22 is dependent, inter alia, on the material of the component 1, 8, 18.

Then, a working gas, e.g. He, $H_2$ or Ar, is fed to a volume 17 of the pulsed plasma source 14, and power is fed to this working gas introducing extremely high power in the region of 10 GW, such as by way of a high-current arc discharge 15, 16, within an extremely short time. The result is the formation of a pulsed plasma beam 20 which emerges in the manner of a detonation from a nozzle 21 of the pulsed plasma source 14 and penetrates into the sublimable material 22 with which the surface section 7, 7' has been coated, and the total energy of which plasma beam, which includes thermal and kinematic components, causes the material 22 to sublime in a short high-energy pulse. On account of the high pressure on the layer resulting from the deceleration of the extremely highly accelerated particles of the plasma jet 20, this sublimation detonation shock is introduced directly into the component 1 and leads to a shock wave. As a result, the component is strengthened and hardened down to penetration depths of approximately 2 mm on account of microstructural changes. In addition to an initial shock wave, reflected shock waves also occur.

On account of the large area of action of the plasma jet 20 on the surface section 7, 7' coated with sublimable material 22, this area amounting to approximately 10 cm² or larger, the pulsed plasma strengthening proves to be an extremely economical process. Even surface sections 7, 7' which are narrow or normally difficult to gain access to now can be pulsed plasma strengthened by suitably selecting the holding and positioning device for the pulsed plasma source 14 and the substrate 1, 18.

Figure 2:
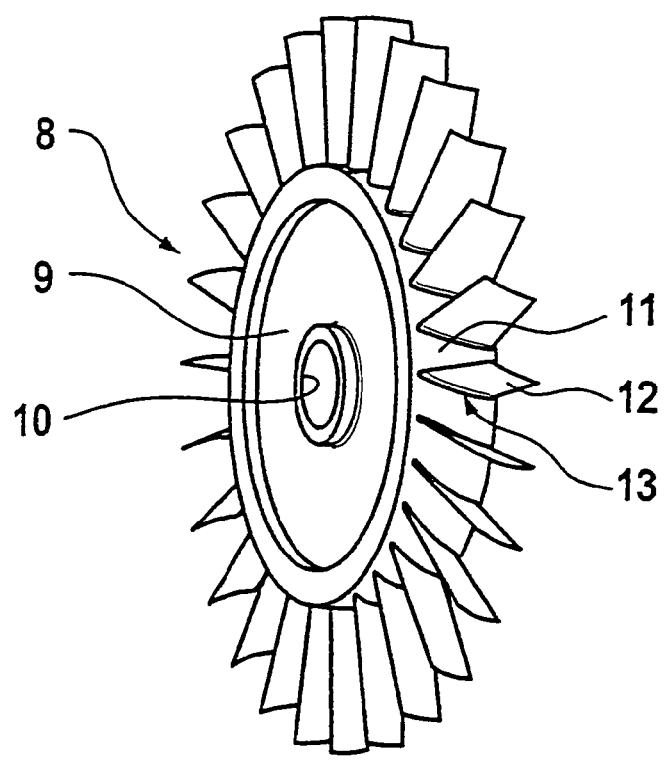
FIG. 2 is a perspective illustration of a rotor of a gas turbine, which substantially comprises a disc with a hub and blades.

FIG. 2 shows an integrally bladed rotor, which is denoted overall by numeral 8 and substantially comprises a disc 9 with a hub 10 and a circumferential surface 11 as well as substantially radially extending blades 12. The blades 12 of an integrally bladed rotor 8 are subject to dynamic loads not only in the critical regions which have already been described in connection with the blade or vane 1 illustrated in FIG. 1 but also in particular in the transition region from the blade leaf to the circumferential surface 11 of the disc 9. In the disc 9, the hole region of the hub 10 is subject to particularly high loads, on account of the high tensile stresses caused by the centrifugal force.

The critical surface sections of the rotor 8 in the transition region between a blade 12 and the circumferential surface 11 of the disc 9 and the hole region of the hub 10 are pulsed plasma strengthened substantially in accordance with the process steps which have been described in connection with the blade or vane 1 shown in FIG. 1. First of all, a layer 22 of sublimable, generally organic material, such as for example a thermoplastic, is applied to the surface section which is to be strengthened, corresponding to 7, 7' in FIG. 1. For each plasma jet 20, a working gas, such as Ar, is fed to a pulsed plasma source 14, the nozzle 21 of which is directed onto the surface section which is to be strengthened. A power supply 15, 16, such as a high-current arc discharge, is used to supply an extremely high power to the working gas in order to generate the plasma jet 20, which comprises electrons and positively charged atomic nuclei (ions) and therefore includes matter. The pulsed plasma source 14 operates at a frequency in the range from 1–10 Hz, so that the plasma jet 20 emerges from the pulsed plasma source 14 in the manner of a detonation and in this way impinges on and penetrates into the layer of sublimable material 22.

The layer of sublimable material 22 serves as an energy-transmitting medium so that the sublimation detonation shock which results from the sublimation in a short high-energy pulse is introduced directly into the region of the rotor 8 which is to be strengthened, where a shock wave is formed, causing the region in the rotor 8 to be strengthened and hardened on account of microstructural changes.

By suitably selecting the holding and positioning device for the pulsed plasma source 14 and the rotor 8, interior cavities, such as the hole region of the hub 10 of the rotor 8, which are subject to high loads, can now be pulsed plasma strengthened using the processes described without any difficulty.

Components which have already been damaged in operation, such as for example a blade or vane 1 shown in FIG. 1 or an integrally bladed rotor 8 shown in FIG. 2 or torque-transmitting shafts, in which wear occurs in the form of notches, cracks or fretting, can have their remaining service life increased to the level of undamaged new parts by pulsed plasma strengthening of surface sections which lie in the region of the damage. Particularly in the case of cracks or notches, propagation of the damage is prevented by the permanent compressive stresses which are introduced into the surface section by the pulsed plasma strengthening and extend into the component down to a depth of approximately 2 mm.

In the case of components which are damaged by cracks or the like, the surface section 7, 7' which is to be strengthened and is therefore to be provided with a layer of sublimable material 22 lies around this damage. The subsequent action of a plasma jet 20 causes permanent compressive stresses, which prevent further crack propagation, to be introduced by the shock wave which has been introduced into the component, e.g. the blade or vane 1.

FIG. 3 shows a simplified illustration of a device for carrying out the process for the pulsed plasma strengthening of a metallic component 18, which substantially comprises a pulsed plasma source, which is denoted overall by numeral 14 and is based on a pulsed high-current arc discharge with a variable pulse energy, pulse width and pulse sequence frequency which can be adapted to the particular application. The process is carried out discontinuously using a plurality of pulsed plasma jets 20. Should the area of the region of the component 18 which is to be strengthened be larger than the area of action of the plasma jet 20 on the component surface, the pulsed plasma source 14 and the component 18 are moved with respect to one another during the process, so that the entirety of the desired surface section can be exposed to the pulsed plasma jets 20.

Particularly in the case of relatively large surface sections 7, 7' which are to be strengthened, it is additionally contemplated to use what is known as a magnetic nozzle, in which the plasma jet 20 is controlled, diverted or shaped using a magnetic field in order to achieve a uniform energy density. In this way, annular plasma jets 20 can be generated, for example, for the pulsed plasma strengthening of discs.

The pulsed plasma source 14 comprises two cooled electrodes 15, 16, between which an arc discharge with an extremely high energy density is generated. The working gas used is a noble gas or a chemically reactive gas, such as for example He, $H_2$ or Ar. The working gas is fed via valves 19 to a volume 17 of the pulsed plasma source 14 which is open towards the metallic component 18 which is to be pulsed plasma strengthened at least in sections. Depending on the particular application, the component 18 is positioned at a distance in the range from 20 cm to 1 m from the pulsed plasma source 14.

The arc which is generated emits heat to the working gas, which is ionized so as to form a plasma and leaves the pulsed plasma source 14 at the nozzle 29 in the manner of a detonation in the form of a pulsed plasma jet 20 which is indicated by arrows and is at an extremely high temperature and velocity. The plasma jet 20 is a mixture of electrons and positively charged atomic nuclei (ions) and includes approximately 50% kinetic energy and 50% thermal energy. When the plasma jet 20 impinges on and penetrates into the layer 22 of thermoplastic which has been applied to the surface section, e.g. 7, 7', of the component 18 which is to be strengthened by plasma pulses, the plastic sublimes in a short high-energy pulse and transmits the sublimation detonation shock in the form of a shock wave into the component 18. The layer 22 therefore serves as an energy-transmitting medium for introducing the sublimation detonation shock into the component 18.

Immediately after the detonation-like emergence of the plasma gas 20 from the pulsed plasma source 14, further working gas is fed to the pulsed plasma source 14 via the valves 19, and this gas is in turn heated by the arc between anode and cathode 14 and 15, respectively, and emerges in the manner of a detonation through the nozzle 21 towards the component 18. The frequency is in the range from 1–10 Hz.

The arc of the pulsed plasma source 14 is not transmitted onto the component 18, so that the component remains relatively cool during the process even though, depending on the particular application, it may be arranged at only a short distance from the nozzle 21 of the pulsed plasma source 14.

The process and device for the pulsed plasma strengthening can also be applied to other metallic components of thermal, power or working machines in which regions which extend from the surface into the component are to be strengthened or hardened by the introduction of permanent compressive stresses.

The invention claimed is:

1. Process for pulsed plasma strengthening of a metallic component, comprising coating a surface section of a metallic component with a sublimable material, applying a pulsed plasma jet to the surface section under a vacuum so that the material is sublimed and shock wave is introduced into the components to form residual compressive stresses in a region which extends from the surface section into the component.

2. Process according to claim 1, wherein the component is a Ti- or Fe- or Ni- or Co-based alloy.

3. Process according to claim 1, wherein the component is a gas turbine component subject to vibrational loads.

4. Process according to claim 3, wherein the component is a blade, vane or disc of a compressor or of a turbine.

5. Process according to claim 1, wherein the sublimable material is organic.

6. Process according to claim 1, wherein the sublimable material is a plastic.

7. Process according to claim 1, wherein the sublimable material is a thermoplastic.

8. Process according claim 1, wherein the pulsed plasma jet is applied to areas of the surface section, which areas are of sizes different from each other.

9. Process according to claim 8, wherein the pulsed plasma jet in the surface section is arranged to act on an area of approximately 10 $cm^2$ per plasma pulse.

10. Process according to claim 1, wherein the residual compressive stresses are introduced in a region which extends from the surface section as far as 2 mm into the component.

11. Process according to claim 1, wherein the pulsed plasma jet is generated capacitively or inductively using high-frequency field or on the basis of a pulsed high-current arc discharge.

12. Process according to claim 1, wherein the pulsed plasma jet includes matter to which the surface section is exposed.

13. Process according to claim 12, wherein the pulsed plasma jet has thermal and kinetic energy.

14. Process according to claim 1, wherein the pulsed plasma jet impinges on the surface section as a detonation.

15. Process according to claim 1, wherein the plasma jet is pulsed in an approximately 1–10 Hz frequency range.

16. Process according to claim 1, wherein the plasma jet has a velocity of at least approximately 150 km/s.

17. Process according to claim 1, wherein the component is a damaged metallic component, and the surface section lies in a damaged region of the component.

* * * * *